United States Patent
Cao et al.

(10) Patent No.: US 10,141,840 B2
(45) Date of Patent: Nov. 27, 2018

(54) FEEDBACK CONTROL CIRCUIT AND POWER MANAGEMENT MODULE SHORTENING FEEDBACK RESPONSE TIME

(71) Applicant: Shenzhen China Star Optoelectronics Technology Co., Ltd., Shenzhen, Guangdong (CN)

(72) Inventors: Dan Cao, Guangdong (CN); Xianming Zhang, Guangdong (CN)

(73) Assignee: Shenzhen China Star Optoelectronics Co., Ltd, Shenzhen, Guangdong (CN)

(*) Notice: Subject to any disclaimer, the term of this patent is extended or adjusted under 35 U.S.C. 154(b) by 333 days.

(21) Appl. No.: 14/917,006

(22) PCT Filed: Jan. 14, 2016

(86) PCT No.: PCT/CN2016/070915
§ 371 (c)(1),
(2) Date: Mar. 5, 2016

(87) PCT Pub. No.: WO2017/107267
PCT Pub. Date: Jun. 29, 2017

(65) Prior Publication Data
US 2018/0045779 A1 Feb. 15, 2018

(30) Foreign Application Priority Data
Dec. 21, 2015 (CN) .......................... 2015 1 0967353

(51) Int. Cl.
*H02M 3/156* (2006.01)
*G05F 1/625* (2006.01)

(52) U.S. Cl.
CPC ............. *H02M 3/156* (2013.01); *G05F 1/625* (2013.01)

(58) Field of Classification Search
CPC ........................................ H02M 3/156–3/1588
See application file for complete search history.

(56) References Cited

U.S. PATENT DOCUMENTS 6,181,120 B1* 1/2001 Hawkes ................ H02M 3/156 323/282
7,268,410 B1* 9/2007 Hopper ................ H02M 7/003 257/379

(Continued)

FOREIGN PATENT DOCUMENTS

CN 101039077 A 9/2007
CN 102361395 A 2/2012

(Continued)

*Primary Examiner* — Kyle J Moody
*Assistant Examiner* — Peter Novak
(74) *Attorney, Agent, or Firm* — Andrew C. Cheng

(57) ABSTRACT

Disclosed is a feedback control circuit and a power management module, wherein the feedback control circuit includes a sample analysis circuit, a comparison circuit and a switch control circuit, and the sample analysis circuit samples an output signal of the power management chip, and analyzes a variation trend of the output signal to obtain a first output signal; the comparison circuit compares the first output signal and a reference signal to obtain a second output signal; the switch control circuit comprises a Pulse Width Modulation PWM control circuit and a switch, wherein the PWM control circuit is coupled to the comparison circuit and the switch control circuit, and the switch is coupled to the power management chip, and the switch control signal adjusts a duty ratio of the switch according to the second output signal to adjust a compensation duration of the output signal of the power management chip.

14 Claims, 2 Drawing Sheets

(56) References Cited

U.S. PATENT DOCUMENTS

| | | | |
|---|---|---|---|
| 9,716,436 B2* | 7/2017 | Xu | H02M 3/1588 |
| 2003/0185024 A1* | 10/2003 | Lethellier | H02J 1/102 |
| | | | 363/65 |
| 2004/0150378 A1* | 8/2004 | Gattavari | H02M 3/156 |
| | | | 323/282 |
| 2009/0185397 A1 | 7/2009 | Forghani-zadeh et al. | |
| 2012/0153922 A1 | 6/2012 | Chen | |

FOREIGN PATENT DOCUMENTS

| | | |
|---|---|---|
| CN | 203135723 U | 8/2013 |
| CN | 104682745 A | 6/2015 |
| CN | 104734477 A | 6/2015 |
| CN | 204517684 U | 7/2015 |
| CN | 105099189 A | 11/2015 |
| JP | 2012253854 A | 12/2012 |

* cited by examiner

FEEDBACK CONTROL CIRCUIT AND POWER MANAGEMENT MODULE SHORTENING FEEDBACK RESPONSE TIME

CROSS REFERENCE

This application claims the priority of Chinese Patent Application No. 201510967353.3, entitled "Feedback control circuit and power management module", filed on Dec. 21, 2015, the disclosure of which is incorporated herein by reference in its entirety.

FIELD OF THE INVENTION

The present invention relates to an integrated circuit field, and more particularly to a feedback control circuit and a power management module.

BACKGROUND OF THE INVENTION

The Power Management IC (PMIC) is generally applied in kinds of electronic equipments, and employed to effectively distribute kinds of power sources to the various units in the electronic equipments to make these units normally work. For outputting the stable voltage in condition of loading variation, the PMIC generally comprises the feedback circuit. The feedback circuit can detect the variation of the output voltage/output current of the PMIC, and perform compensation to the output voltage/output current of the PMIC according to the variation for maintaining the stability of the output voltage/output current.

In practical application, the feedback circuit requires a certain response time from detection of the output signal of the PMIC to the compensation thereto. Although, the feedback circuit according to prior art can perform compensation to the output signal of the PMIC according to the loading variation, the response time is fixed, and will not change along with the loading variation no matter how the loading changes. However, as the loading variation changes faster, the output rippled is larger due to the longer response time in the heavy loading condition, and the issue of the electromagnetic compatibility can occur.

SUMMARY OF THE INVENTION

The embodiment of the present invention provides a feedback control circuit and a power management module, which can shorten the feedback response time of the power management chip, and can reduce the ripple of the output signal of the power management chip to promote the output stability of the power management chip.

First, the embodiment of the present invention provides a feedback control circuit, wherein the feedback control circuit comprises a sample analysis circuit, a comparison circuit and a switch control circuit, wherein:

the sample analysis circuit is coupled to a power management chip, and employed to sample an output signal of the power management chip, and analyze a variation trend of the output signal to obtain a first output signal;

the comparison circuit is coupled to the sample analysis circuit and the switch control circuit, and employed to compare the first output signal and a reference signal to obtain a second output signal;

the switch control circuit comprises a Pulse Width Modulation PWM control circuit and a switch, wherein the PWM control circuit is coupled to the comparison circuit and the switch, and the switch is coupled to the power management chip, and the switch control circuit is employed to adjust a duty ratio of the switch according to the second output signal to adjust a compensation duration of the output signal of the power management chip.

In some possible embodiments, the sample analysis circuit is a differentiating circuit, and employed to perform differentiating calculation to the output signal to obtain a gradient of the output signal, and the gradient of the output circuit is the first output signal.

In some possible embodiments, the differentiating circuit comprises a first operational amplifier, a first capacitor, a first resistor and a second resistor, wherein:

an inverting input end of the first operational amplifier is coupled to an output pin of the power management chip sequentially through the first capacitor and first resistor which are coupled in series, and a non-inverting input end of the first operational amplifier is grounded, and an output end of the first operational amplifier is coupled to the comparison circuit, and coupled to the inverting input end of the first operational amplifier through the second resistor.

In some possible embodiments, a non-inverting input end of the comparison circuit is coupled to an output end of the sample analysis circuit, and an inverting input end of the comparison circuit receives the reference signal, and an output end of the comparison circuit is coupled to the PWM control circuit.

In some possible embodiments, the comparison circuit is employed for:

outputting high voltage level as the first output signal is larger than the reference signal;

outputting low voltage level as the first output signal is smaller than the reference signal.

In some possible embodiments, an input end of the PWM control circuit is coupled to an output end of the comparison circuit; an output end of the PWM control circuit is coupled to a first end of the switch;

a second end of the switch is coupled to the output pin of the power management chip, and a third end of the switch is grounded.

In some possible embodiments, the switch is a metal oxide semiconductor MOS transistor.

Second, the embodiment of the present invention provides a power management module, and the power management module comprises a power management chip and the feedback control circuit provided first or any possible embodiments provided first.

In some possible embodiments, the power management module further comprises a peripheral control circuit of the power management chip.

In embodiment of the present invention, the feedback control circuit comprises the sample analysis circuit, the comparison circuit and the switch control circuit, and the sample analysis circuit samples the output signal of the power management chip, and analyze the variation trend of the output signal to obtain the first output signal, and the comparison circuit compares the first output signal and the reference signal to obtain the second output signal, and the PWM control circuit in the switch control circuit generates the PWM signal and adjusts the duty ratio of the switch coupled with the power management chip according to the second output signal to adjust the compensation duration of the output signal of the power management chip. Because the circuit structure is simple, the variation of the output signal of the power management chip can be responded to the switch control circuit in time to shorten the feedback response time and reduce the rippled of the output signal.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The embodiment of the present invention provides a feedback control circuit and a power management module, which can shorten the feedback response time of the power management chip, and can reduce the ripple of the output signal of the power management chip to promote the output stability of the power management chip. The detail descriptions are respectively introduced below.

Figure 1:
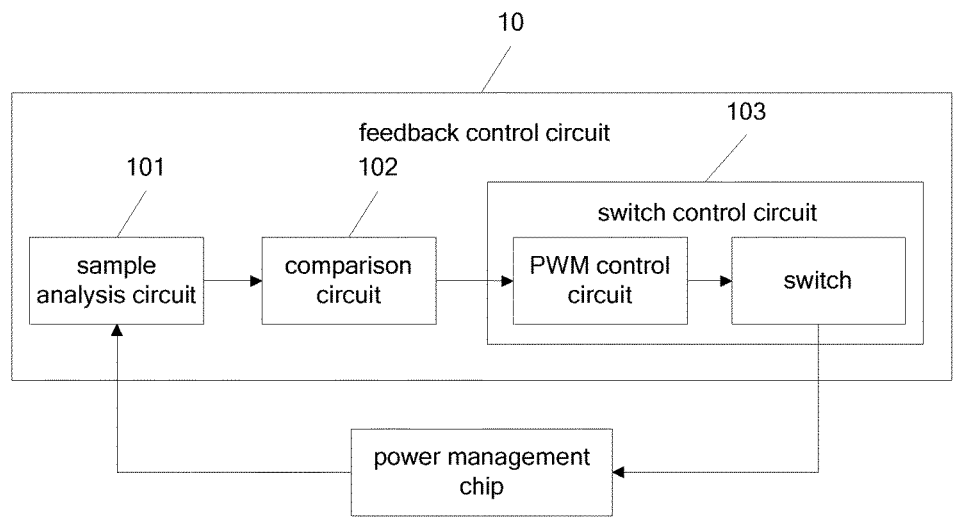
FIG. 1 is a structure diagram of a feedback control circuit provided by one embodiment of the present invention.

Please refer to FIG. 1, which is a structure diagram of a feedback control circuit provided by one embodiment of the present invention. The feedback control circuit 10 is applied in a power management chip. As shown in FIG. 1, the feedback control circuit comprises a sample analysis circuit 101, a comparison circuit 102 and a switch control circuit 103, wherein:

the sample analysis circuit 101 is coupled to a power management chip, and employed to sample an output signal of the power management chip, and analyze a variation trend of the output signal to obtain a first output signal.

Selectably, the output signal of the power management chip can be a voltage signal or a current signal.

In some possible embodiments, the sample analysis circuit 101 can be a differentiating circuit, and the output signal of the differentiating circuit is proportional to the change rate of the input signal. As the input signal of the differentiating circuit, i.e. the output signal of the power management chip changes, the gradient of the output signal of the power management chip can be obtained with the differentiating circuit, and the gradient is the first output signal.

The comparison circuit 102 is coupled to the sample analysis circuit 101 and the switch control circuit 103, and employed to compare the first output signal and a reference signal to obtain a second output signal.

In the specific embodiment, the second output signal can be high voltage level or low voltage level. The comparison circuit 102 can compare the aforesaid first output signal with the reference signal, and output high/low voltage level according to the comparison result. For instance, if the first output signal is larger than the reference signal, the comparison circuit 102 outputs the high voltage level, and otherwise, the comparison circuit 102 outputs the low voltage level. The reference signal of the comparison circuit 102 can be supplied with other circuits or devices.

The switch control circuit 103 comprises a Pulse Width Modulation (PWM) control circuit and a switch, wherein the PWM control circuit is coupled to the comparison circuit 102 and the switch, and the switch is coupled to the power management chip, and the switch control circuit 103 is employed to adjust a duty ratio of the switch according to the second output signal to adjust a compensation duration of the output signal of the power management chip.

In the specific embodiment, an input end of the PWM control circuit is coupled to an output end of the comparison circuit 102, and an output end of the PWM control circuit is coupled to the switch. The PWM control circuit generates the PWM signal which can control the duty ratio of the switch according to the second output signal outputted by the comparison circuit 102, and outputs the PWM signal to the control end of the switch. The larger the duty ratio is, the longer the conduction period of the switch in one cycle will be. The switch conduction period of the switch can be controlled by manipulating the duty ratio of the switch, and then to control the compensation duration of the output signal of the power management chip for stabilizing the aforesaid output signal.

Selectably, the aforesaid switch can be a field effect transistor or a triode. Preferably, the aforesaid switch can be a MOS.

In embodiment of the present invention, the feedback control circuit comprises the sample analysis circuit, the comparison circuit and the switch control circuit, and the sample analysis circuit samples the output signal of the power management chip, and analyze the variation trend of the output signal to obtain the first output signal, and the comparison circuit compares the first output signal and the reference signal to obtain the second output signal, and the PWM control circuit in the switch control circuit generates the PWM signal and adjusts the duty ratio of the switch coupled with the power management chip according to the second output signal to adjust the compensation duration of the output signal of the power management chip. Because the circuit structure is simple, the variation of the output signal of the power management chip can be responded to the switch control circuit in time to shorten the feedback response time and reduce the rippled of the output signal to promote the output stability of the power management chip.

Figure 2:
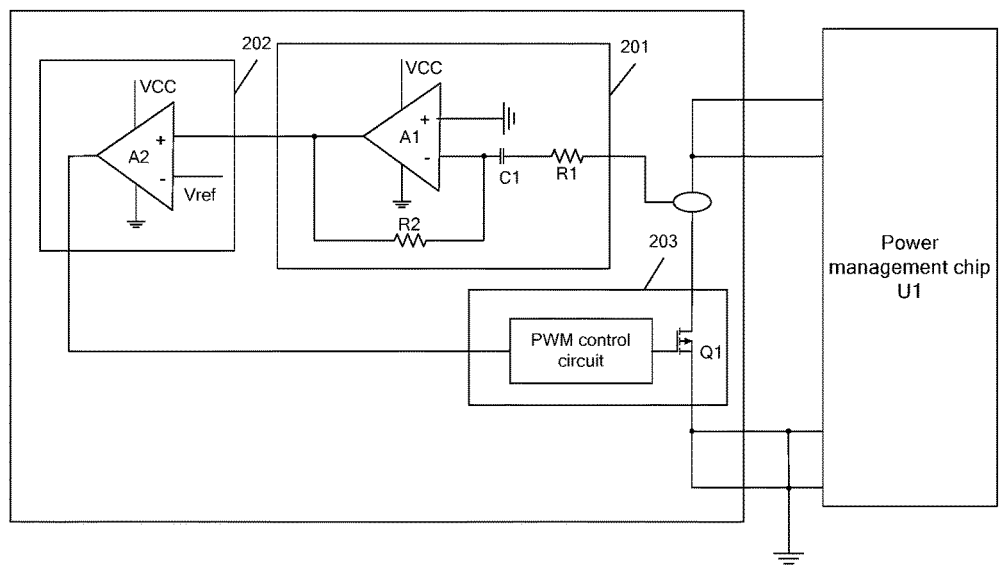
FIG. 2 is a circuit diagram of a feedback control circuit provided by one embodiment of the present invention.

Please refer to FIG. 2, is a circuit diagram of a feedback control circuit provided by one embodiment of the present invention. The feedback control circuit 20 is applied in a power management chip U1. As shown in FIG. 2, the feedback control circuit can comprise a sample analysis circuit 201, a comparison circuit 202 and a switch control circuit 203, wherein the switch control circuit 203 comprises a PWM control circuit 2031 and a switch Q1.

The sample analysis circuit 201 comprises a first operational amplifier A1, a first capacitor C1, a first resistor R1 and a second resistor R2. An inverting input end of the first operational amplifier A1 is coupled to an output pin of the power management chip U1 sequentially through the first capacitor C1 and first resistor R1 which are coupled in series, and a non-inverting input end of the first operational amplifier A1 is grounded, and an output end of the first operational amplifier A1 is coupled to the comparison circuit 202, and coupled to the inverting input end of the first operational amplifier A1 through the second resistor R2.

In some possible embodiments, the first operational amplifier A1, the first capacitor C1 and the first resistor R1 of the sample analysis circuit 201 construct a differentiating circuit, and the output signal of the differentiating circuit is proportional to the change rate of the input signal. As the input signal of the differentiating circuit (i.e. the output signal of the power management chip) changes, the gradient of the output signal of the power management chip can be obtained with the differentiating circuit, and the gradient is the first output signal.

Selectably, the output signal of the power management chip can be a voltage signal or a current signal.

The comparison circuit 202 is realized with a comparator A2. A non-inverting input end of the comparator A2 is coupled to an output end of the first operational amplifier A1 (i.e. the output end of the sample analysis circuit 201), and an inverting input end of the comparator A2 receives the reference signal Vref, and the output end of the comparator A2 is coupled to the input end of the PWM control circuit 2031. The output end of the PWM control circuit 2031 is coupled to a control end (i.e. the first end) of the switch Q1. The second end and the third end of the switch Q1 are respectively coupled to the power management chip and grounded.

In some possible embodiments, the second output signal can be high voltage level or low voltage level. The comparator A2 compares the first output signal outputted by the sample analysis circuit 201 with the reference signal Vref received from the inverting input end. The comparator A2 outputs high voltage level as the first output signal is larger than the reference signal Vref; the comparator A2 outputs low voltage level as the first output signal is smaller than the reference signal Vref. The reference signal of the comparator A2 can be supplied with other circuits or devices.

In the specific embodiment, the PWM control circuit 2031 generates the PWM signal which can control the duty ratio of the switch according to the second output signal outputted by the comparator A2, and outputs the PWM signal to the control end of the switch Q1. The larger the duty ratio is, the longer the conduction period of the switch Q1 in one cycle will be. The switch conduction period of the switch Q1 can be controlled by manipulating the duty ratio of the switch Q1, and then to control the compensation duration of the output signal of the power management chip U1 for achieving the function of stabilizing the aforesaid output signal.

Selectably, the aforesaid switch can be a field effect transistor or a triode. Preferably, the aforesaid switch can be a MOS.

Selectably, the feedback control circuit 20 can be integrated inside the power management chip U1, or externally coupled to the power management chip.

In embodiment of the present invention, the feedback control circuit comprises the sample analysis circuit, the comparison circuit and the switch control circuit, and the sample analysis circuit samples the output signal of the power management chip, and analyze the variation trend of the output signal to obtain the first output signal, and the comparison circuit compares the first output signal and the reference signal to obtain the second output signal, and the PWM control circuit in the switch control circuit generates the PWM signal and adjusts the duty ratio of the switch coupled with the power management chip according to the second output signal to adjust the compensation duration of the output signal of the power management chip. Because the circuit structure is simple, the variation of the output signal of the power management chip can be responded to the switch control circuit in time to shorten the feedback response time and reduce the rippled of the output signal to promote the output stability of the power management chip.

Figure 3:
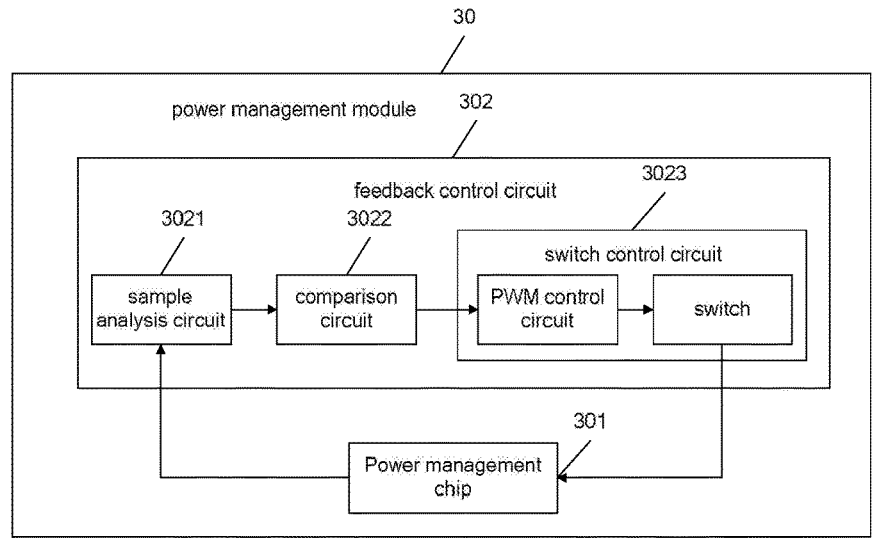
FIG. 3 is a structure diagram of a power management module provided by one embodiment of the present invention.

Please refer to FIG. 3, which is a structure diagram of a power management module provided by one embodiment of the present invention. As shown in FIG. 3, the power management module 30 can comprise a power management chip 301 and a feedback control circuit 302, wherein the feedback control circuit 302 comprises a sample analysis circuit 3021, a comparison circuit 3022 and a switch control circuit 3023. The feedback control circuit 302 can be integrated inside the power management chip 301, or externally coupled to the power management chip 301.

The sample analysis circuit 3021 is coupled to a power management chip 301, and employed to sample an output signal of the power management chip 301, and analyze a variation trend of the output signal to obtain a first output signal.

Selectably, the output signal of the power management chip 301 can be a voltage signal or a current signal.

In some possible embodiments, the sample analysis circuit 3021 can be a differentiating circuit, and the output signal of the differentiating circuit is proportional to the change rate of the input signal. As the input signal of the differentiating circuit, i.e. the output signal of the power management chip 301 changes, the gradient of the output signal of the power management chip 301 can be obtained with the differentiating circuit, and the gradient is the first output signal.

The comparison circuit 3022 is coupled to the sample analysis circuit 3021 and the switch control circuit 3023, and employed to compare the first output signal and a reference signal to obtain a second output signal.

In the specific embodiment, the second output signal can be high voltage level or low voltage level. The comparison circuit 3022 can compare the aforesaid first output signal with the reference signal, and output high/low voltage level according to the comparison result. For instance, if the first output signal is larger than the reference signal, the comparison circuit 3022 outputs the high voltage level, and otherwise, the comparison circuit 3022 outputs the low voltage level. The reference signal of the comparison circuit 3022 can be supplied with other circuits or devices.

The switch control circuit 3023 comprises a Pulse Width Modulation PWM control circuit and a switch, wherein the PWM control circuit is coupled to the comparison circuit 3022 and the switch, and the switch is coupled to the power management chip, and the switch control circuit 3023 is employed to adjust a duty ratio of the switch according to the second output signal to adjust a compensation duration of the output signal of the power management chip.

In the specific embodiment, an input end of the PWM control circuit is coupled to an output end of the comparison circuit 3022, and an output end of the PWM control circuit is coupled to the switch. The PWM control circuit generates the PWM signal which can control the duty ratio of the switch according to the second output signal outputted by the comparison circuit 3022, and outputs the PWM signal to the control end of the switch. The larger the duty ratio is, the longer the conduction period of the switch in one cycle will be. The switch conduction period of the switch can be controlled by manipulating the duty ratio of the switch, and then to control the compensation duration of the output signal of the power management chip for stabilizing the aforesaid output signal.

Selectably, the aforesaid switch can be a field effect transistor or a triode. Preferably, the aforesaid switch can be a MOS.

In embodiment of the present invention, the power management module comprises the feedback control circuit, and the feedback control circuit comprises the sample analysis circuit, the comparison circuit and the switch control circuit, and the sample analysis circuit samples the output signal of the power management chip, and analyze the variation trend of the output signal to obtain the first output signal, and the comparison circuit compares the first output signal and the reference signal to obtain the second output signal, and the PWM control circuit in the switch control circuit generates the PWM signal and adjusts the duty ratio of the switch coupled with the power management chip according to the second output signal to adjust the compensation duration of the output signal of the power management chip. Because the circuit structure is simple, the variation of the output signal of the power management chip can be responded to the switch control circuit in time to shorten the feedback response time and reduce the rippled of the output signal to promote the output stability of the power management chip.

Figure 4:
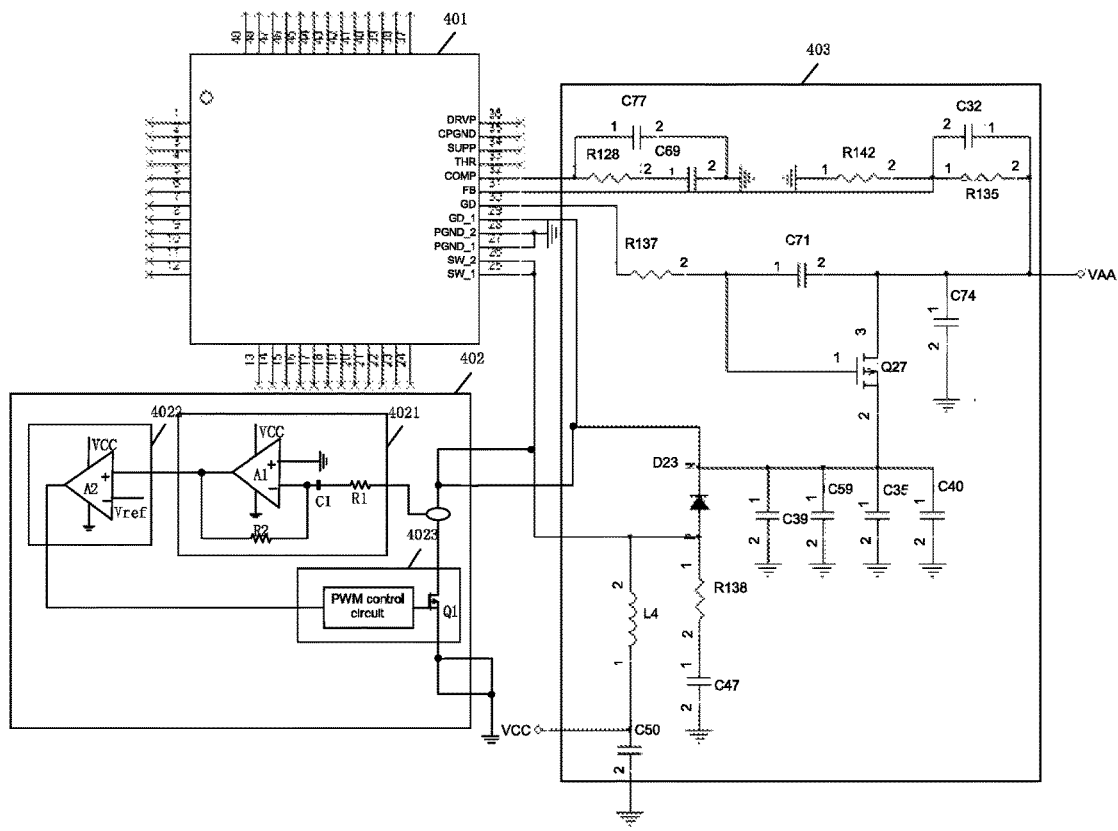
FIG. 4 is a circuit diagram of a power management module provided by one embodiment of the present invention.

Please refer to FIG. 4, which is a circuit diagram of a power management module provided by one embodiment of the present invention. As shown in FIG. 4, the power management module 40 can comprise a power management chip 401, a feedback control circuit 402 and a peripheral control circuit 403, wherein the feedback control circuit 402 comprises a sample analysis circuit 4021, a comparison circuit 4022 and a switch control circuit 4023. The switch control circuit 403 comprises a PWM control circuit 4031 and a switch Q1. The feedback control circuit 402 can be integrated inside the power management chip 401, or externally coupled to the power management chip 401.

In the specific embodiment, the circuit structure and the achievement of the feedback control circuit 402 can be referred to the related description of the embodiment shown in FIG. 2. The repeated description is omitted here.

In some possible embodiments, the power management chip 401 can comprise the MAX 17409 chip, the MAX749 chip, the BQ24010DRCRchip, the HX5562R11U chip, but not limited thereto, wherein the HX5562R11U chip is illustrated in FIG. 4 for explanation.

In the specific embodiment, the peripheral control circuit 403 is externally coupled to the power management chip 401 to act the protection functions, such as the overvoltage protection, the undervoltage protection, the overcurrent protection, overtemperature protection for the power management chip 401 for ensuring the stable work of the power management chip 401.

According to the related description of FIG. 2, the power management module in the embodiment of the present invention can shorten the feedback response time of the power management chip, and can reduce the ripple of the output signal of the power management chip to promote the output stability of the power management chip.

Above are embodiments of the present invention, which does not limit the scope of the present invention. Any modifications, equivalent replacements or improvements within the spirit and principles of the embodiment described above should be covered by the protected scope of the invention.

What is claimed is:

1. A feedback control circuit shortening a feedback response time of a power management chip, wherein the feedback control circuit comprises a sample analysis circuit, a comparison circuit and a switch control circuit, wherein:
   the sample analysis circuit is coupled to the power management chip, and employed to sample a power managing output signal of the power management chip, and analyze a variation trend of the power managing output signal to obtain a first output signal;
   the comparison circuit is coupled to the sample analysis circuit and the switch control circuit, and employed to compare the first output signal and a reference signal to obtain a second output signal;
   the switch control circuit comprises a Pulse Width Modulation PWM control circuit and a switch, wherein the PWM control circuit is coupled to the comparison circuit and the switch, and the switch is coupled to the power management chip, and the switch control circuit is employed to adjust a duty ratio of the switch according to the second output signal to adjust a compensation duration of the power managing output signal of the power management chip to response a variation of the power managing output signal to the switch control circuit in time to reduce a ripple of the output signal the power managing output signal, wherein the differentiating circuit comprises a first operational amplifier, a first capacitor, a first resistor and a second resistor, wherein: an inverting input end of the first operational amplifier is coupled to an output pin of the power management chip sequentially through the first capacitor and first resistor which are coupled in series, and a non-inverting input end of the first operational amplifier is grounded, and an output end of the first operational amplifier is coupled to the comparison circuit, and coupled to the inverting input end of the first operational amplifier through the second resistor.

2. The feedback control circuit according to claim 1, wherein the sample analysis circuit is a differentiating circuit, and employed to perform differentiating calculation to the power managing output signal to obtain a gradient of the power managing output signal, and the gradient of the output circuit is the first output signal.

3. The feedback control circuit according to claim 1, wherein a non-inverting input end of the comparison circuit is coupled to an output end of the sample analysis circuit, and an inverting input end of the comparison circuit receives the reference signal, and an output end of the comparison circuit is coupled to the PWM control circuit.

4. The feedback control circuit according to claim 3, wherein the comparison circuit is employed for:
   outputting high voltage level as the first output signal is larger than the reference signal;
   outputting low voltage level as the first output signal is smaller than the reference signal.

5. The feedback control circuit according to claim 1, wherein an input end of the PWM control circuit is coupled to an output end of the comparison circuit; an output end of the PWM control circuit is coupled to a first end of the switch;
   a second end of the switch is coupled to the output pin of the power management chip, and a third end of the switch is grounded.

6. The feedback control circuit according to claim 5, wherein the switch is a metal oxide semiconductor MOS transistor.

7. A power management module shortening a feedback response time of a power management chip, wherein the power management module comprises a power management chip and the feedback control circuit, and the feedback control circuit comprises a sample analysis circuit, a comparison circuit and a switch control circuit, wherein:

the sample analysis circuit is coupled to a power management chip, and employed to sample a power managing output signal of the power management chip, and analyze a variation trend of the power managing output signal to obtain a first output signal;

the comparison circuit is coupled to the sample analysis circuit and the switch control circuit, and employed to compare the first output signal and a reference signal to obtain a second output signal;

the switch control circuit comprises a Pulse Width Modulation PWM control circuit and a switch, wherein the PWM control circuit is coupled to the comparison circuit and the switch, and the switch is coupled to the power management chip, and the switch control circuit is employed to adjust a duty ratio of the switch according to the second output signal to adjust a compensation duration of the power managing output signal of the power management chip to response a variation of the power managing output signal to the switch control circuit in time to reduce a ripple of the output signal the power managing output signal, wherein the differentiating circuit comprises a first operational amplifier, a first capacitor, a first resistor and a second resistor, wherein: an inverting input end of the first operational amplifier is coupled to an output pin of the power management chip sequentially through the first capacitor and first resistor which are coupled in series, and a non-inverting input end of the first operational amplifier is grounded, and an output end of the first operational amplifier is coupled to the comparison circuit, and coupled to the inverting input end of the first operational amplifier through the second resistor.

8. The power management module according to claim 7, wherein the sample analysis circuit is a differentiating circuit, and employed to perform differentiating calculation to the power managing output signal to obtain a gradient of the output signal, and the gradient of the output circuit is the first output signal.

9. The power management module according to claim 7, wherein a non-inverting input end of the comparison circuit is coupled to an output end of the sample analysis circuit, and an inverting input end of the comparison circuit receives the reference signal, and an output end of the comparison circuit is coupled to the PWM control circuit.

10. The power management module according to claim 9, wherein the comparison circuit is employed for:

outputting high voltage level as the first output signal is larger than the reference signal;

outputting low voltage level as the first output signal is smaller than the reference signal.

11. The power management module according to claim 7, wherein an input end of the PWM control circuit is coupled to an output end of the comparison circuit; an output end of the PWM control circuit is coupled to a first end of the switch;

a second end of the switch is coupled to the output pin of the power management chip, and a third end of the switch is grounded.

12. The power management module according to claim 11, wherein the switch is a metal oxide semiconductor MOS transistor.

13. The power management module according to claim 7, wherein the feedback control circuit of the power management chip is integrated inside the power management chip.

14. The power management module according to claim 7, wherein the power management module further comprises a peripheral control circuit of the power management chip.

* * * * *